United States Patent
Wong et al.

(10) Patent No.: US 8,379,522 B2
(45) Date of Patent: Feb. 19, 2013

(54) LINK AGGREGATION FLOOD CONTROL

(75) Inventors: Jonathan B. Wong, Alhambra, CA (US); Jeff S. Dallacqua, Oakland, CA (US); Sindhu K. Mohandas, Thousand Oaks, CA (US)

(73) Assignee: Alcatel Lucent, Paris (FR)

( * ) Notice: Subject to any disclaimer, the term of this patent is extended or adjusted under 35 U.S.C. 154(b) by 299 days.

(21) Appl. No.: 12/657,195

(22) Filed: Jan. 15, 2010

(65) Prior Publication Data

US 2011/0176544 A1 Jul. 21, 2011

(51) Int. Cl.
*H04L 1/00* (2006.01)
*H04L 12/26* (2006.01)
*H04L 12/28* (2006.01)
*H04L 12/56* (2006.01)

(52) U.S. Cl. ............... 370/235; 370/230.1; 370/231; 370/392

(58) Field of Classification Search .......... 370/230–231, 370/235, 389, 392
See application file for complete search history.

(56) References Cited

U.S. PATENT DOCUMENTS

| | | | | |
|---|---|---|---|---|
| 6,456,597 B1* | 9/2002 | Bare | ............ | 370/252 |
| 6,801,525 B1* | 10/2004 | Bodnar et al. | ............ | 370/352 |
| 6,944,158 B1* | 9/2005 | Wilson et al. | ............ | 370/392 |
| 2007/0047453 A1* | 3/2007 | Bender et al. | ............ | 370/244 |
| 2009/0182854 A1* | 7/2009 | Sun et al. | ............ | 709/223 |
| 2010/0107162 A1* | 4/2010 | Edwards et al. | ............ | 718/1 |

* cited by examiner

*Primary Examiner* — Ronald Abelson
(74) *Attorney, Agent, or Firm* — Garlick & Markison

(57) ABSTRACT

A network interfaced unit includes a first data processing device, a second data processing device coupled to the first data processing device, memory coupled to the first data processing device, and instructions accessible from the memory by the first data processing device. The instructions are configured for causing the first data processing device to carry out operations for causing a copy of a frame received by the second data processing device to be received by the first data processing device in response to a destination address of the frame failing to be found in an address lookup table accessibly by the second data processing device and for causing the first data processing device to query other network interface units after receiving the copy of the frame for determining if the destination address of the frame has been learned on any one of the other network interface units.

20 Claims, 3 Drawing Sheets

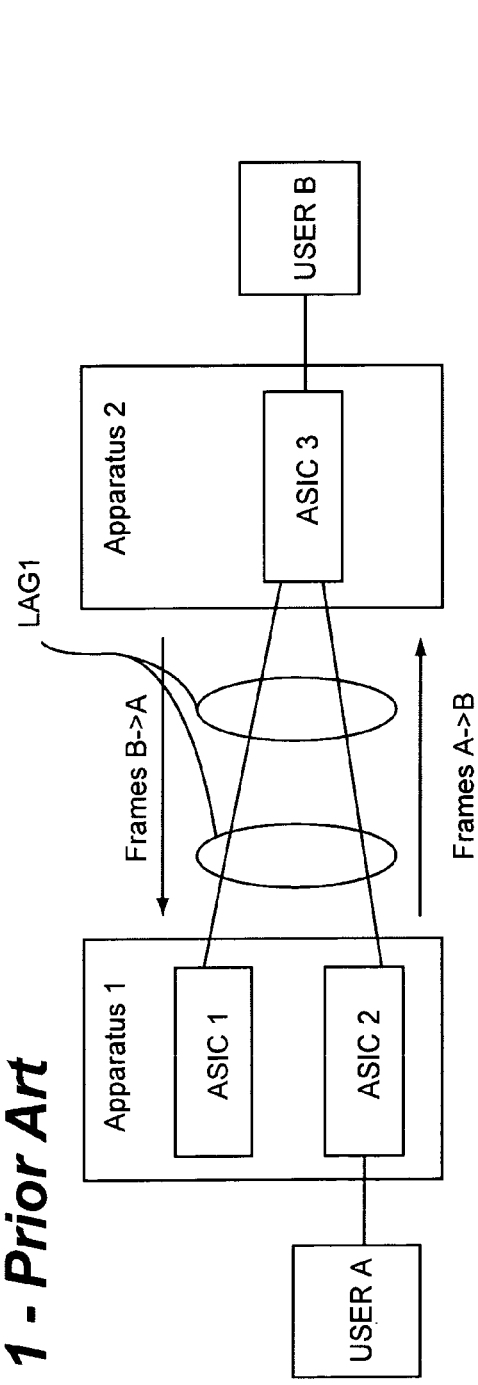
FIG. 1 - Prior Art
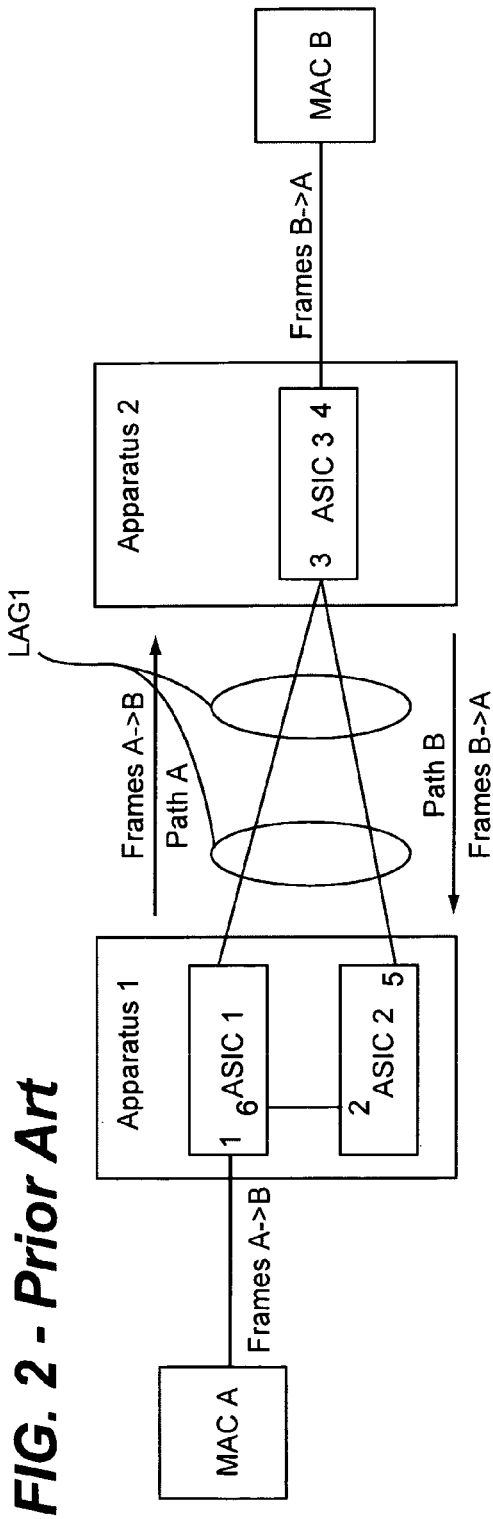
FIG. 2 - Prior Art

FIG. 4

| DA MAC | VLAN ID | Is Trunk | TID/PortID | IS SA Trunk |
|--------|---------|----------|------------|-------------|

| DA MAC | VFI | -- | -- | IS SA Trunk |
|--------|-----|----|----|-------------|

LINK AGGREGATION FLOOD CONTROL

FIELD OF THE DISCLOSURE

The disclosures made herein relate generally to link aggregation between two network communication devices and, more particularly, to implementation of link aggregation flood control.

BACKGROUND

With network switching devices that incorporate certain types and/or brands of ASICs (application specific integrated circuits), there exists the possibility of traffic flooding if link aggregation ports belonging to the same link aggregation (i.e., group of aggregated physical links) span across two ASICs within a common network device. Broadcom (BCM) brand XGS family ASICs is one example of such a type and/or brand of ASICs whose link aggregation hashing algorithm can lead to such traffic flooding problems. Traffic flooding in this manner translates into traffic drop in an operational network, which is highly undesirable.

Referring to FIG. 1, for link aggregation functionality with an ASIC configured for providing network interface functionality (e.g., an Broadcom XGS family ASIC of a line card (i.e., network interface line card), load balancing with a system (e.g., system of network interface apparatuses (e.g., switches) each having one of more network interface units) is implemented for the purpose of distributing traffic across all ports of an aggregate group (i.e., link aggregation group LAG1). To this end, a Broadcom ASIC provides different options for load balancing traffic. One of the common options used is for its link aggregation hashing algorithm to be based on both source MAC address and destination MAC address of an Ethernet frame. Therefore, as shown in FIG. 1, depending on source MAC address and the destination MAC address, traffic between two entities/peers (i.e., Apparatus1 and Apparatus 2) over aggregation links AL1 provided by ASICs 1, 2 and 3 may not flow through the same physical link (i.e., port) in both traffic flow directions (i.e., traffic flow direction for initiation and traffic flow direction for response), though they belong to the same link aggregation group (i.e., LAG1). For traffic flowing from User A to User B (i.e., Frames A→B), the MAC address of User A is the source address and the MAC address of User B is the destination address. Similarly, for traffic flowing from User B to User A (i.e., Frames B→A), the MAC address of User B is the source address and the MAC address of User A is the destination address.

One important aspect relating to Broadcom XGS family ASICs is that the MAC address table-aging timer setting is unique to the whole ASIC. Specifically, a user cannot configure aging time based on port, VLAN (virtual local area network), link aggregation, or per flow basis. Because of the implementation requirements and limitations of this load balancing mechanism, it may introduce flooding problem for traffic over a link aggregation configuration.

Referring to FIG. 2, traffic is initiated from MAC A (e.g., User A) with a destination of MAC B (e.g., User B). Accordingly, frames are sent from MAC A to MAC B. But, due to an unknown destination address of MAC B, MAC A is learned on port locations 1, 2, and 3 due to flooding and Path A is selected for this flow (e.g., due to hashing). MAC B responds, but due to hashing, MAC B takes a different route than Path A (i.e., Path B), which will be learned on port locations 4, 5 and 6. In this example, Path B is selected for traffic flow from MAC B to MAC A. Now, traffic is unicasting in two different paths (i.e., Path A and Path B of Link Aggregation LA1) due to hashing and unicasting along these two paths continues for about 1 aging period. Because frames sent from MAC A to MAC B always take path A, MAC A at port 2 will not be refreshed anymore after initial flooding and will be aged out after roughly 1 aging period. Furthermore, because MAC A is no longer coming through network interface 2 and frames from MAC B to MAC A will be flooded out on network interface 2 according to flood limit setting. Lastly, as long as there is traffic flowing from MAC B to MAC A, MAC A will never be learned at port 2 and flooding will continue.

Still referring to FIG. 2, traffic is initiated from MAC B with a destination of MAC A. Accordingly, frames are sent from MAC B to MAC A. But, due to unknown destination address MAC A, MAC A is learned on port locations 4, 5, and 6 due to flooding. Path B is again selected for this traffic flow. MAC A responds, but, because MAC A is learned on linkagg 1 on location 6 and it is unicast, Path A is chosen. MAC A is now learned on port locations 1 and 3. Now, traffic from MAC B to MAC A will take Path B and MAC A will not be refreshed on network interface 2 and eventually it will be aged out. Therefore, frames from MAC B to MAC A will always flooding out on network interface 2 and traffic from MAC A to MAC B will be unicast.

The current solution to this flooding problem is to have all MAC addresses learned to be synchronized between all network interfaces. This solution can be achieved by synchronizing newly learned MAC addresses over to all ASICs. One example of an interconnect mechanism for providing communication functionality to support such synchronization is offered by Broadcom under the trademarked brand name HiGig, which is a proprietary interconnect mechanism compatible with Broadcom brand ASICS (e.g., Strata XGS family of ASICs). Such an interconnect mechanism allows communication between devices (e.g., ASICs) each having an implementation of the interconnect mechanism in combination therewith. The HiGig protocol supports various switching functions like Quality-of-Service (QoS), link aggregation, etc. After synchronizing the newly learned MAC addresses over to all ASICs, depending on the aging time setting and prior to aging time interval expiration, those MAC addresses that are learned locally are read out and traversed through the whole L2 (i.e., Layer 2) table periodically, and synchronizes, to all network interfaces in the system. On the other hand, if a particular MAC address is aged out due to inactivity, a system component such as a Chassis Management Module (CMM) can inform other network interfaces about this event and this MAC address will be deleted from all other network interfaces as well. A CMM is a module that is responsible for operational state of a whole system component chassis (e.g., network interface card state, temperature, responding to user requests, etc. Therefore, at any given time, MAC address content from all ASICs will be uniformly the same. If frames ingress into a particular network interface and the destination is on other network interfaces, then these frames will be bridged/unicast out (e.g., via an interconnect mechanism such as HiGig).

A skilled person will appreciate that synchronizing newly learned MAC addresses over to all ASIC does help resolve the link aggregation flooding problems discussed above in reference to FIG. 2. For the traffic having frames are sent from MAC A to MAC B (i.e., traffic initiated from MAC A with a destination of MAC B), MAC A is learned on port locations 1, 2, and 3 due to flooding as a result of an unknown destination address of MAC B. Due to hashing, Path A is selected for this traffic flow. MAC B responses, but due to hashing, MAC B takes a different route (i.e., Path B) and will be learned on port locations 4, 5 and 6. Now traffic is unicasting in two different paths due to hashing. Prior to aging time interval expiration, each network interface (e.g., software thereof) reads out the L2 table on network interface 1 and synchronizes MAC A from network interface 1 to network interface 2 and network interface 2 synchronizes MAC B from network interface 2 to network interface 1. As long as traffic is sending bi-directionally between MAC A and MAC B, these two MAC addresses will be synchronized between the two network interfaces and traffic therebetween will be bridged/unicast back and forth.

Similarly, for the traffic having frames are sent from MAC B to MAC A (i.e., traffic initiated from MAC B with a destination of MAC A), MAC B is learned on port locations 4, 5, and 6 due to flooding as a result of an unknown destination address of MAC A. Path B is selected for this traffic flow. MAC A responses, MAC A is learned at port location 1, and immediately this MAC A is synchronized over to network interface 2 (i.e., is learned at port location 2). At the same time, because MAC B is learned on port location 6 on a link aggregation, Path A is chosen and traffic flow from MAC B to MAC A will be bridged/unicast out on Path A. Accordingly, traffic flow is unicasting in two different paths due to hashing. Prior to aging time interval expiration, each network interface (e.g., software thereof) reads out the L2 table on network interface 1 and synchronizes MAC A from network interface 1 to network interface 2 and network interface 2 synchronizes MAC B from network interface 2 to network interface 1. As long as traffic is sending bi-directionally between MAC A and MAC B, these two MAC addresses will be synchronized between the two network interfaces and traffic therebetween will be bridged/unicast back and forth.

Even though the synchronization scheme discussed above does help resolve link aggregation flooding problems, it is not without shortcomings. These shortcomings arise at least partially because all MAC addresses are synchronized between all network interfaces. One example of such shortcomings relates to scalability. MAC address capacity of a system/chassis will be the same as the individual ASIC capacity, regardless of the number of network interfaces in the system (e.g., a maximum of 32K MAC addresses when using Broadcom XGS family ASICs). Another example of such shortcomings relates to excess traffic which keeps all MAC addresses from each Network Interface card synchronized. There will be excess traffic generated on the interconnect scheme (e.g., HiGig) between network interfaces and this excess traffic will increase significantly with increase number of network interfaces. Furthermore, this excess traffic significantly limits the ability to support more advance system configurations such as, for example, virtual chassis configurations and multi-chassis configurations. Another example of such shortcomings relates to wasting L2 (Layer 2) TCAM (Ternary Content Addressable Memory) space. MAC addresses are added to the ASIC L2 TCAM and they are not inserted based on "need-to-know" basis. This will typically lead to wasting valuable resources of limited L2 TCAM space. Still another example of such shortcomings relates to an inability to mix ASICs. It will be expected that all ASICs of a network interface will have the same capacity. Therefore, network interfaces with various size ASICs cannot be mixed in a system. Yet another example of such shortcomings relates to complication to network interface software. Extra software will be required to perform synchronization at a timing basis.

SUMMARY OF THE DISCLOSURE

Embodiments of the present invention resolved traffic flooding problem caused by link aggregation hashing algorithm in certain types and/or configurations of network interface devices (e.g., ASICs) when link aggregation configuration spans over multiple network interface devices. Broadcom brand XGS family ASICs is one example of such a type and/or configuration of network interface device whose link aggregation hashing algorithm can lead to such traffic flooding problems. More specifically, embodiments of the present invention allow a network interface apparatus (e.g., a switch) to be scalable to larger configuration, cause MAC addresses to be learned on a need-to-know basis only so no unnecessary L2 MAC entries will be wasted, and/or also allows ASICs with various size L2 table to be mixed into a single chassis/stack. In this manner, embodiments of the present invention advantageously overcome the abovementioned shortcomings associated with relying upon having all MAC addresses learned to be synchronized between all network interfaces to mitigate traffic flooding problems caused by link aggregation hashing algorithm.

In one embodiment of the present invention, a network interface apparatus comprises a network interface unit including a central processing unit, an application specific integrated circuit (ASIC) coupled to the central processing unit, memory coupled to the central processing unit, and instructions accessibly from the memory by the central processing unit. The ASIC provides network interface functionality with at least one remote network interface apparatus. Such network interface functionality includes receiving a stream of frames thereon from a frame source. The ASIC copies a frame of a respective stream of frames received thereby to the central processing unit in response to a destination address of the frame having failed to be found in an address lookup table thereof. The instructions are configured for causing the central processing unit to query other network interface units for determining if the destination address of the frame provided thereto has been learned on any one of the other network interface units.

In another embodiment of the present invention, a method begins with one of a plurality of network interface units of system performing an operation for receiving a frame of a traffic stream. The frame receiving network interface unit then performs an operation for copying the frame to a central processing unit thereof in response to a destination address of the frame failing to be found in an address lookup table of the frame receiving network interface unit. After receiving the copy of the frame, the central processing unit of the frame receiving network interface unit performs an operation for querying other ones of the network interface units for determining if the destination address of the frame has been learned on any one of the other ones of the network interface units. A designated one of the other network interface units performs and operation for providing the designation address to at least one other one of the other network interface units in response to at least one of the other network interface units successfully determining that the destination address of the frame has been learned thereon.

In another embodiment of the present invention, a network interfaced unit comprises a first data processing device of a first type of data processing device, a second data processing device coupled to the first data processing device, memory coupled to the first data processing device, and instructions accessible from the memory by the first data processing device. The second data processing device is of a second type of data processing device different than the first type of data processing device. The instructions are configured for causing the first data processing device to carry out operations for causing a copy of a frame received by the second data processing device to be received by the first data processing device in response to a destination address of the frame failing to be found in an address lookup table accessibly by the second data processing device and for causing the first data processing device to query other network interface units after receiving the copy of the frame for determining if the destination address of the frame has been learned on any one of the other network interface units.

These and other objects, embodiments, advantages and/or distinctions of the present invention will become readily apparent upon further review of the following specification, associated drawings and appended claims.

BRIEF DESCRIPTION OF THE DRAWINGS

FIG. 1 is a diagrammatic view showing a prior art system having a link aggregation group provided between network interface apparatuses thereof.

FIG. 2 is a diagrammatic view showing resulting traffic flow paths between the network interface apparatuses of FIG. 1 when a link aggregation configuration spans over multiple network interface units (e.g., network interface ASICs) in one of the network interface apparatuses.

FIG. 4 shows virtual local area network (VLAN) and virtual private LAN service (VPLS) payload information for a query frame in accordance with the present invention.

DETAILED DESCRIPTION OF THE DRAWING FIGURES

Figure 3:
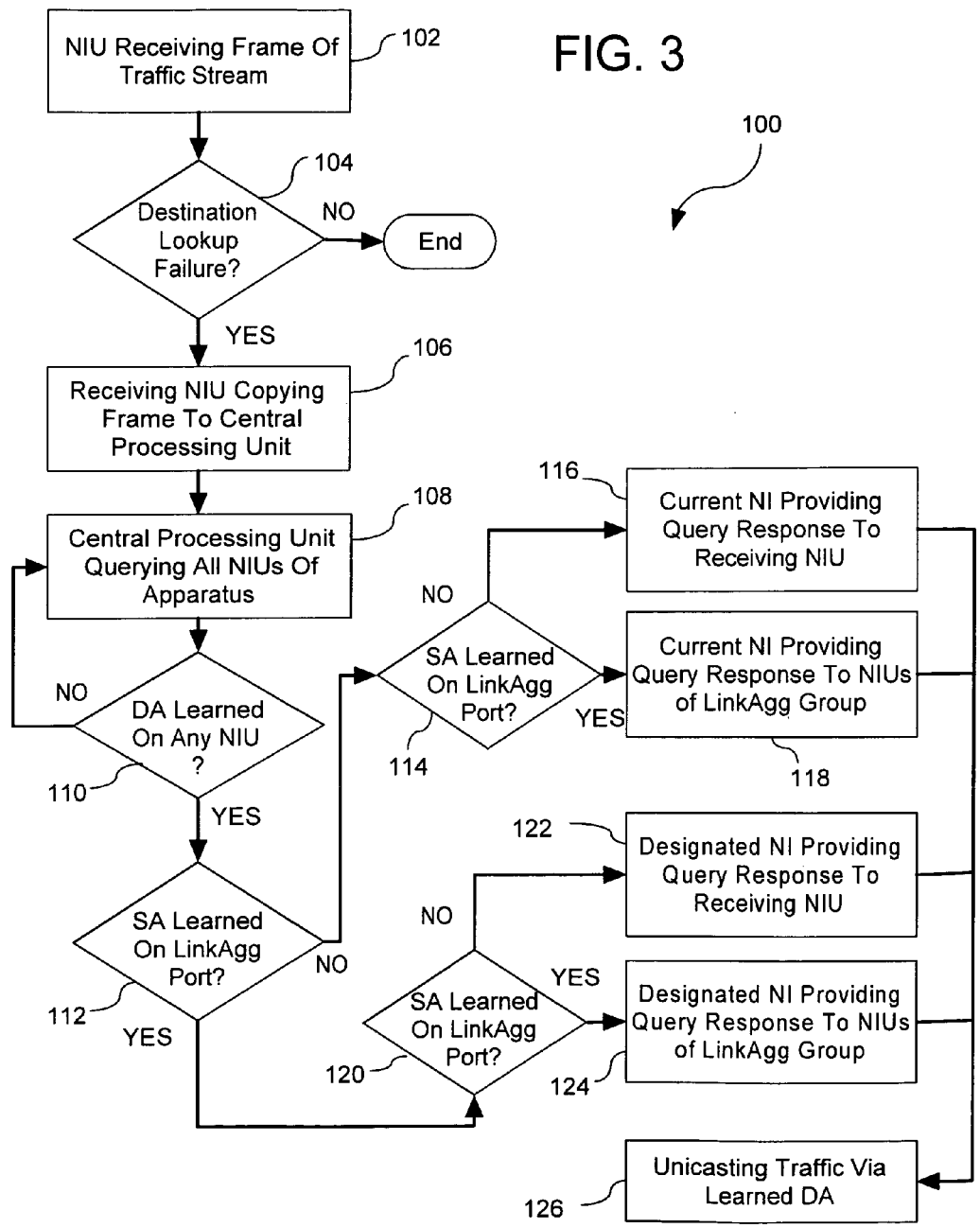
FIG. 3 is a method for performing address insertion functionality in accordance with an embodiment of the present invention.

Embodiments of the present invention allow MAC addresses to be inserted to L2 (layer 2) TCAM (Ternary Content Addressable Memory) space of various network interface units of a network interface apparatus (e.g., switch) on a "need-to-know" basis only. Skilled persons also commonly refer to the L2 TCAM space as the L2 address table. More specifically, the network interface units are queried to determine if a particular destination MAC address has been learned thereon if that particular destination MAC address is unknown to a network interface unit that received a data transmission unit (e.g., frame) having that destination MAC address. Advantageously, if such querying determines that one network interface unit of a link aggregation group has that particular destination MAC address learned thereon, a mechanism in accordance with the present invention can be enacted for causing other network interface units of the link aggregation group to learn that particular destination MAC address. Such query and enacted learning is referred to herein as address insertion functionality. A line card including an ASIC that is configured for providing network interface functionality via ports of the line card is an example of a network interface unit in accordance with the present invention.

For implementing such address insertion functionality, a network interface apparatus can require that that certain apparatus configuration requirements be met. One such requirement is that all link aggregation configuration information to be populated on all network interface units of a network interface apparatus, even if certain ones of the network interface units do not belong to any of the Link Aggregation trunk group on the network interface apparatus. Another such requirement is that each network interface unit is configured with the ability to trap (i.e., copy) any Destination Lookup Failed (DLF) data transmission unit to a central processing unit (CPU) of the network interface apparatus. Preferably, but not necessarily, only the first received packet would be trapped to the CPU (i.e., for the specific DLF DA MAC addresses) in order to avoid subsequent/excessive packets to trap to the CPU. Still another such requirement is that each network interface unit is configured with the ability to unicast Ethernet frames via an interconnect mechanism (e.g., Broadcom's HiGig interface) to only specific network interface units and/or ASICs. Thus, it is disclosed herein that each network interface unit (e.g., each ASIC thereof) and/or the central processing unit of a network, interface apparatus configured in accordance with the present invention has in combination therewith at least one interconnect mechanism for providing communication functionality therebetween. Still another such requirement is that each network interface unit is configured with the ability to broadcast a targeted frame over to all network interface units of the apparatus via the interconnect mechanism. Yet another such requirement is that each network interface unit is configured such that, as long as any frame is destined to a particular MAC address, the L2 table entry having that particular MAC address will not be aged out from the L2 table (e.g., via enabling destination address hit bit functionality).

Preferably, but not necessarily, network interface apparatuses have network interface units thereof implemented in a distributed manner. As such, each one of the network interface unit includes a central processing unit, instructions accessible by the central processing unit, and an ASIC configured for providing network interface functionality. The instructions are configured for causing the processor and/or ASIC to perform operations for carrying out address insertion functionality. Accordingly, in a distributed processing mode of operation, each one of the network interface units is capable of initiating and/or responding to operations relating to address insertion functionality. It is disclosed herein that the central processing unit is a first data processing device of a first type and each one of the ASICs is a data processing device of a second type different than the first type.

Referring to FIG. 3, a method 100 for providing address insertion functionality in accordance with an embodiment of the present invention is disclosed. The method 100 begins with one of a plurality of network interface units of an apparatus performing an operation 102 for receiving a frame of a traffic stream at an ASIC thereof. The ASIC of the frame receiving network interface unit (i.e., the network interface unit that received the frame) then performs an operation 104 for determining if a destination MAC address of the frame is within the L2 address table (i.e., an address lookup table) accessible by the ASIC (e.g., an address lookup table of the ASIC). If the destination MAC address is found in the L2 address table of the frame receiving network interface unit, the method 100 ends. If the destination is not found in the L2 address table of the frame receiving network interface unit, the ASIC of the frame receiving network interface unit performs an operation 106 for copying (i.e., trapping) the frame to the central processing unit of the frame receiving network interface unit.

After the central processing unit receives the copied instance of the frame, the central processing unit of the frame receiving network interface unit performs an operation 108 for querying all of other ones of the network interface units to determine if the destination MAC address of the frame has been learned on any one of the other network interface units (i.e., whether this particular MAC address is presented in their local L2 Table). In one embodiment, querying the other network interface units includes multicasting (i.e., transmitting) a query frame to all the other network interface units via an interconnect mechanism such as Broadcom's HiGig interface. In performing such querying, the central processing unit first determines whether the source address of the received frame is learned on a fixed port or a linkagg group, which should be available information because the source address has just been learned and inserted into the L2 table of the frame receiving network interface unit. Each query frame can be an Ethernet frame with predetermined source address and destination address (e.g., addresses known to be already learned by the network interface units) as opposed to the source address and destination address of the received frame. An example of payload information for such a query frame is shown in FIG. 4 for virtual local area network (VLAN) implementation and virtual private LAN service (VPLS) implementation.

Upon each one of the other network interface units receiving the query frame at a central processor thereof, software (i.e., instructions accessibly and processible by the central processor) causes the central processing unit of the respective network interface unit to independently perform an operation 110 for determining whether the destination MAC address of the received frame has been learned locally. If the destination MAC address is not learned on any of the other network interface units to which the query frame was multicast, there will not be a response back to the central processing unit from any of the network interface units and the central processing unit will continue to multicast query frames to the network interface units (e.g., for a predetermined number of tries, a predetermined duration of time, etc).

On the other hand, if the destination MAC address is learned on one of the network interface units (i.e., fixed port) or multiple ones of the network interface units (i.e., Linkagg), then a network interface assessing algorithm such as that shown below will be implemented by the network interface unit having the destination MAC address learned thereon and/or by the central processing unit. In one embodiment, the software comprised such network interface assessing algorithm and the network interface assessing algorithm is thus processed by the central processing unit of a respective network interface unit. In referring to this network interface assessing algorithm, the term NI refers to network interface unit, the term SA refers to source address, the term DA refers to destination address, the term linkagg refers to link aggregation group, and the term current NI refers to the network interface that responded to the query.

Example—Network Interface Assessing Algorithm network interface units successfully determining that the destination address of the frame has been learned thereon.

Still referring to FIG. 3, after the destination MAC address of the received frame has been learned on the network interface units via HiGig, the traffic stream of which the received frame is a component will be unicast.

Accordingly, a skilled person will appreciate that the method 100 advantageously overcomes the abovementioned shortcomings associated with relying upon having all MAC addresses learned to be synchronized between all network interfaces to mitigate traffic flooding problems caused by link aggregation hashing algorithm. Referring back to FIG. 2, for traffic that is initiated from MAC A (e.g., User A) with a destination of MAC B (e.g., User B), frames are sent from MAC A to MAC B. But, due to an unknown destination address of MAC B, MAC A is learned on port locations 1, 2, and 3 due to flooding and Path A is selected for this flow (e.g., due to hashing). Implementation of address insertion functionality in accordance with the present invention causes subsequent frames with MAC B as destination address to be trapped (i.e., copied to the CPU). But with rate limiting on DLF (destination lookup failure), it is anticipated that the central processing unit will not be too busy with processing incoming frames. MAC B responds, but due to hashing, MAC B takes a different route than Path A (i.e., Path B), which will be learned on port locations 4, 5 and 6. In this example, Path B is selected for traffic flow from MAC B to MAC A. Because MAC A is learned at port 2 already due to initial flooding, traffic is now unicasting in two different paths due to hashing. But, DLF stops at NI 1. Frames from MAC a to MAC B always take Path A and will not get to port 2 at all. But, with destination address HIT bit functionality enables enabled, MAC A will not be aged out at port 2 as long as traffic continue from MAC B to MAC A. Thus, as long as traffic is sending bi-directionally between MAC A and MAC B, traffic will continue to be unicast.

Still referring to FIG. 2, for traffic is initiated from MAC B with a destination of MAC A, frames are sent from MAC B to MAC A. But, due to unknown destination address MAC A, MAC A is learned on port locations 4, 5, and 6 due to flooding. Path B is again selected for this traffic flow. At the same time, subsequent frames with MAC A as the destination address will be trapped to the central processing unit of NI 3. But, with

--- if (DA is learned on fixed port) [refer to NO at operation 112 in FIG. 3]
    {if (SA is learned on fixed port) [refer to NO at operation 114 in FIG. 3]
        {Current NI response (via HiGig) to requester NI;} [refer to operation 116 in
        FIG. 3]
else /* SA is learned on linkagg port */ [refer to YES at operation 114 in FIG. 3]
        {Current NI response (via HiGig) to NIs belong to the same linkagg group of
        the SA;} [refer to operation 118 in FIG. 3]}
else /* if (DA is learned on linkagg port) [refer to YES at operation 112 in FIG. 3]
    {if (SA is learned on fixed port) [refer to NO at operation 120 in FIG. 3]
        {Designated NI responses (via HiGig) to requester NI;} [refer to operation
        122 in FIG. 3]
    else /* SA is learned on linkagg port */ [refer to YES at operation 120 in FIG. 3]
        {Designated NI response (via HiGig) to NIs belong to the same linkagg group
        of the SA;} [refer to operation 124 in FIG. 3]}

---

The Designated NI is a NI that has been pre-select among all the NIs that belong to a common link aggregation group. In one embodiment, the Designated NI is the NI with the lowest slot number of all the NIs that belong to the common link aggregation group). Accordingly, a designated one of a plurality of network interface units performs an operation for providing the designation address to at least one other one of the network interface units in response to at least one of the rate limiting on DLF, it is anticipated that the central processing unit will not be too busy with processing incoming frames. Similarly for NI 2, subsequent frames with MAC A as the destination address will be trapped to the central processing unit and, with rate limiting on DLF, it is anticipated that the central processing unit will not be too busy with processing incoming frames. MAC A is learned at port 1 and DLF frame stops at NI 1. Likewise, for NI 3, MAC A is learned at port 1 and DLF frame stops at NI 3. On NI 2, because the DLF frame still traps to the central processing unit, NI2 sends out a query (e.g., query frame via HiGig) again. Because NI 1 knows MAC A, it now response and MAC A is learned at port 2. DLF stops at NI 2: Accordingly, traffic is unicasting in two different paths due to hashing. As long as traffic is sending bi-directionally between MAC A and MAC B, traffic will continue to be unicast.

Referring now to computer readable medium, it will be understood from the inventive disclosures made herein that methods, processes and/or operations adapted for carrying out address insertion functionality as disclosed herein are tangibly embodied by computer readable medium having instructions thereon for carrying out such functionality. In one specific embodiment, the instructions are tangibly embodied for carrying out the method 100 disclosed above to facilitate address insertion functionality. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the inventive disclosures made herein include a compact disk, a hard drive, RAM or other type of storage apparatus that has imaged thereon a computer program (i.e., a set of instructions) adapted for carrying out address insertion functionality in accordance with the inventive disclosures made herein.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A network interface apparatus, comprising:
a plurality of network interface units, wherein each of the plurality of network interface units include:
a central processing unit;
an application specific integrated circuit (ASIC) coupled to the central processing unit;
wherein the ASIC is configured to provide network interface functionality for receiving a stream of frames from a frame source, wherein the ASIC copies a frame of the stream of frames to the central processing unit in response to a destination address of the frame having failed to be found in an address lookup table; and
wherein the central processing unit is configured to query other network interface units of the plurality of network interface units in the network interface apparatus for determining whether the destination address of the frame has been learned by one of the other network interface units.

2. The network interface apparatus of claim 1, further comprising:
an interconnect mechanism coupled to the central processing unit for providing communication functionality between the central processing unit and the other network interface units of the plurality of network interface units in the network interface apparatus.

3. The network interface apparatus of claim 2 wherein:
the ASIC is configured such that the destination address of the frame will not age out of the address lock-up table thereof until a prescribed period of time passes without another frame having the destination address being received thereby.

4. The network interface apparatus of claim 1 wherein the central processing unit is configured to multicast an Ethernet frame the plurality of network interface units in the network interface apparatus, wherein the Ethernet frame includes query information derived from the frame received by the network interface unit.

5. The network interface apparatus of claim 4, further comprising:
an interconnect mechanism coupled to the central processing unit for providing communication functionality between the central processing unit and the plurality of network interface units in the network interface apparatus, wherein the ASIC is configured such that the destination address of the frame will not age out of the address lock-up table thereof until a prescribed period of time passes without another frame having the destination address being received thereby.

6. The network interface apparatus of claim 4 wherein:
the central processing unit is configured to provide a query response message to one of the other network interface units in response to the one of the other network interface units successfully determining that the destination address of said received frame has been learned thereon; and
the network interface unit and the one of the other network interface units are configured within a common link aggregation group.

7. The network interface apparatus of claim 6, further comprising:
an interconnect mechanism coupled to the central processing unit for providing communication functionality between the central processing unit and the other network interface units, wherein the ASIC is configured such that the destination address of the frame will not age out of the address lock-up table thereof until a prescribed period of time passes without another frame having the destination address being received thereby.

8. A method in an apparatus, comprising:
receiving a frame of a traffic stream by one of a plurality of network interface units in the apparatus;
copying the frame to a central processing unit in the one of a plurality of network interface units in response to an address lookup table failing to include a destination address of the frame;
querying other ones of the plurality of network interface units in the apparatus for determining whether the destination address of the frame has been learned by one of the other ones of the plurality of the network interface units; and
providing the destination address to the one of a plurality of network interface units in the apparatus in response to at least one of the other ones of the plurality of the network interface units successfully determining that the destination address of the frame has been learned thereon.

9. The method of claim 8 wherein:
each of the plurality of network interface units includes an interconnect mechanism coupled to a central processing unit thereof for providing communication functionality between the central processing unit thereof and other ones of the plurality of network interface units;
said querying is performed using the interconnect mechanism; and
providing the destination address is performed using the interconnect mechanism.

10. The method of claim 9 wherein:
each of the plurality of network interface units is configured such that a destination address of a frame will not age out of a address lock-up table thereof until a prescribed period of time passes without another frame having the destination address being received thereby; and
a common instance of link aggregation configuration information is provided to the plurality of network interface units.

11. The method of claim 8 wherein querying other ones of the plurality of network interface units includes multicasting to the other ones of the plurality of network interface units an Ethernet frame carrying query information derived from the frame.

12. The method of claim 11 wherein:
each of the plurality of network interface units has an interconnect mechanism coupled to a central processing unit thereof for providing communication functionality between the central processing unit thereof and other ones of the plurality of network interface units;
said querying is performed using the interconnect mechanism;
providing the destination address is performed using the interconnect mechanism;
each one of the plurality of network interface units is configured such that a destination address of a frame will not age out of a address lock up table thereof until a prescribed period of time passes without another frame having the destination address being received thereby; and
a common instance of link aggregation configuration information is provided to the plurality of network interface units.

13. The method of claim 11, further comprising:
a first one of the plurality of other network interface units providing a query response message to the one of a plurality of network interface units receiving the frame in response to a second one of the plurality of other network interface units successfully determining that the destination address of the frame has been learned thereon, wherein a link aggregation group includes the one of a plurality of network interface units receiving the frame, the first one of the plurality of other network interface units and the second one of the plurality of other network interface units.

14. The method of claim 13 wherein:
each one of the plurality of network interface units has an interconnect mechanism coupled to a central processing unit thereof for providing communication functionality between the central processing unit thereof and other ones of the plurality of network interface unit;
said querying is performed using the interconnect mechanism;
providing the destination address is performed using the interconnect mechanism;
each one of the plurality of network interface units is configured such that a destination address of a frame will not age out of a address lock-up table thereof until a prescribed period of time passes without another frame having the destination address being received thereby; and
a common instance of link aggregation configuration information is provided to the plurality of network interface units.

15. A network apparatus, comprising:
a plurality of network interface units, wherein one of the plurality of network interface units include:
an interconnect mechanism configured to communicate with other ones of the plurality of network interface units;
a memory configured to store an address look up table;
at least a first processing device configured to:
process a frame of a stream of frames from an external network apparatus, wherein the frame includes a source address and a destination address;
determine whether the destination address is listed in the address look up table;
when the destination address is not listed in the address look up table, transmit a query to the other ones of the plurality of network interface units over the interconnect mechanism, wherein the query requests information on the destination address of the frame from the other ones of the plurality of network interface units.

16. The network apparatus of claim 15, wherein a set of the plurality of network interface units are assigned to a link aggregation group; and
wherein when another of the plurality of network interface units assigned to the link aggregation group receives the query and determines the destination address and the source address of the frame correspond to addresses associated with the link aggregation group, providing a response to the query with the information on the destination address of the frame to the set of the plurality of network interface units designated in the link aggregation group.

17. The network apparatus of claim 16, wherein the at least a first processing device of the one of the plurality of network interface units is configured to:
receive the response to the query with the information on the destination address of the frame;
store the destination address of the frame in the address look up table of the one of the plurality of network interface units; and
retain the destination address of the frame in the address look up table of the one of the plurality of network interface units until expiration of a prescribed period of time without receiving another frame having the destination address.

18. The network apparatus of claim 17, wherein the another of the plurality of network interface units assigned to the link aggregation group providing a response to the query is a designated network interface unit for the link aggregation group for providing the response to the query.

19. The network apparatus of claim 15, wherein a set of the plurality of network interface units are assigned to a link aggregation group; and
wherein when another of the plurality of network interface units assigned to the link aggregation group receives the query and determines the destination address corresponds to an address associated with the link aggregation group and the source address is not associated with the link aggregation group, providing a response to the query with the information on the destination address of the frame to the one of the plurality of network interface units transmitting the query.

20. The network apparatus of claim 19, wherein the another of the plurality of network interface units assigned to the link aggregation group providing a response to the query is a designated network interface unit for the link aggregation group for providing the response to the query.

* * * * *